Figure 1:
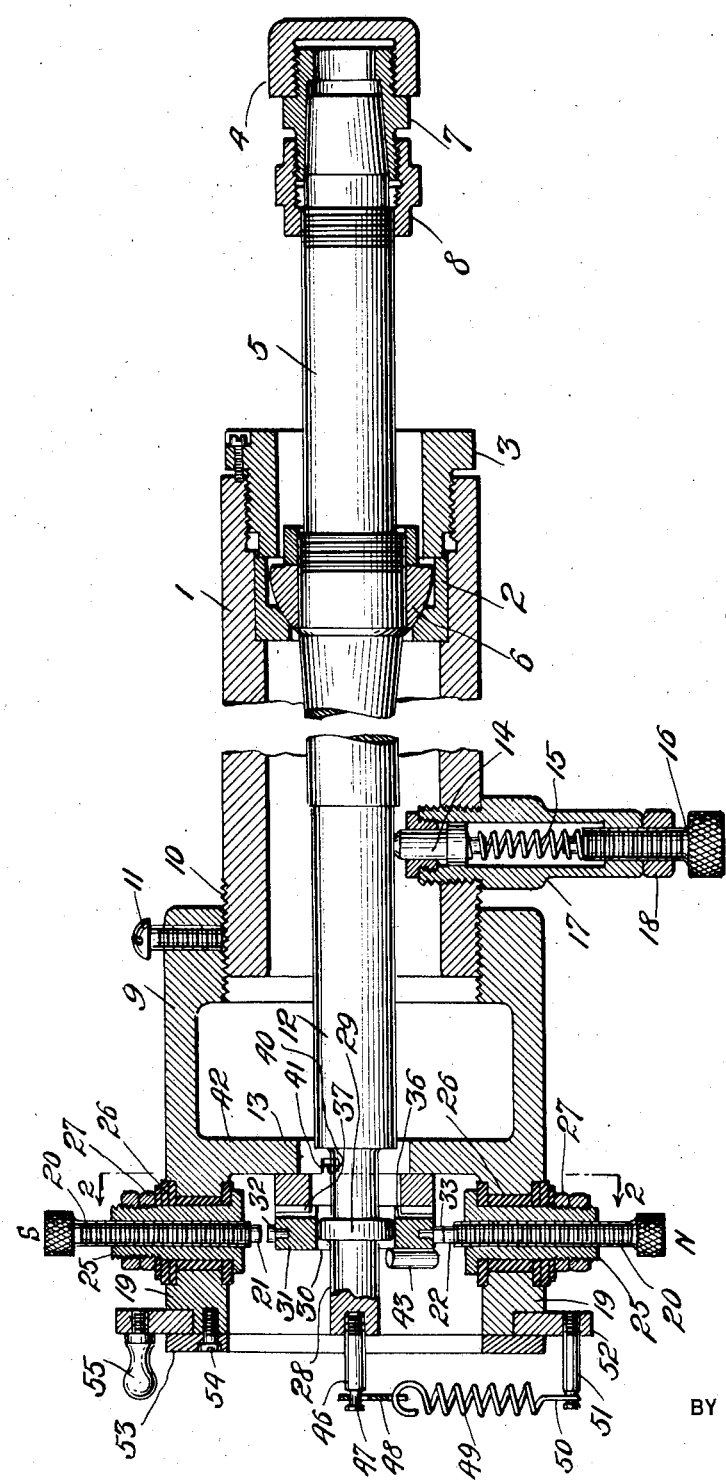

Jan. 12, 1932.  J. C. SHAW ET AL  1,840,853
CONTOURING TRACER
Filed Sept. 6, 1928  4 Sheets-Sheet 1

INVENTOR
John C. Shaw and
Robert D. Shaw
BY
M. H. Lockwood
ATTORNEY

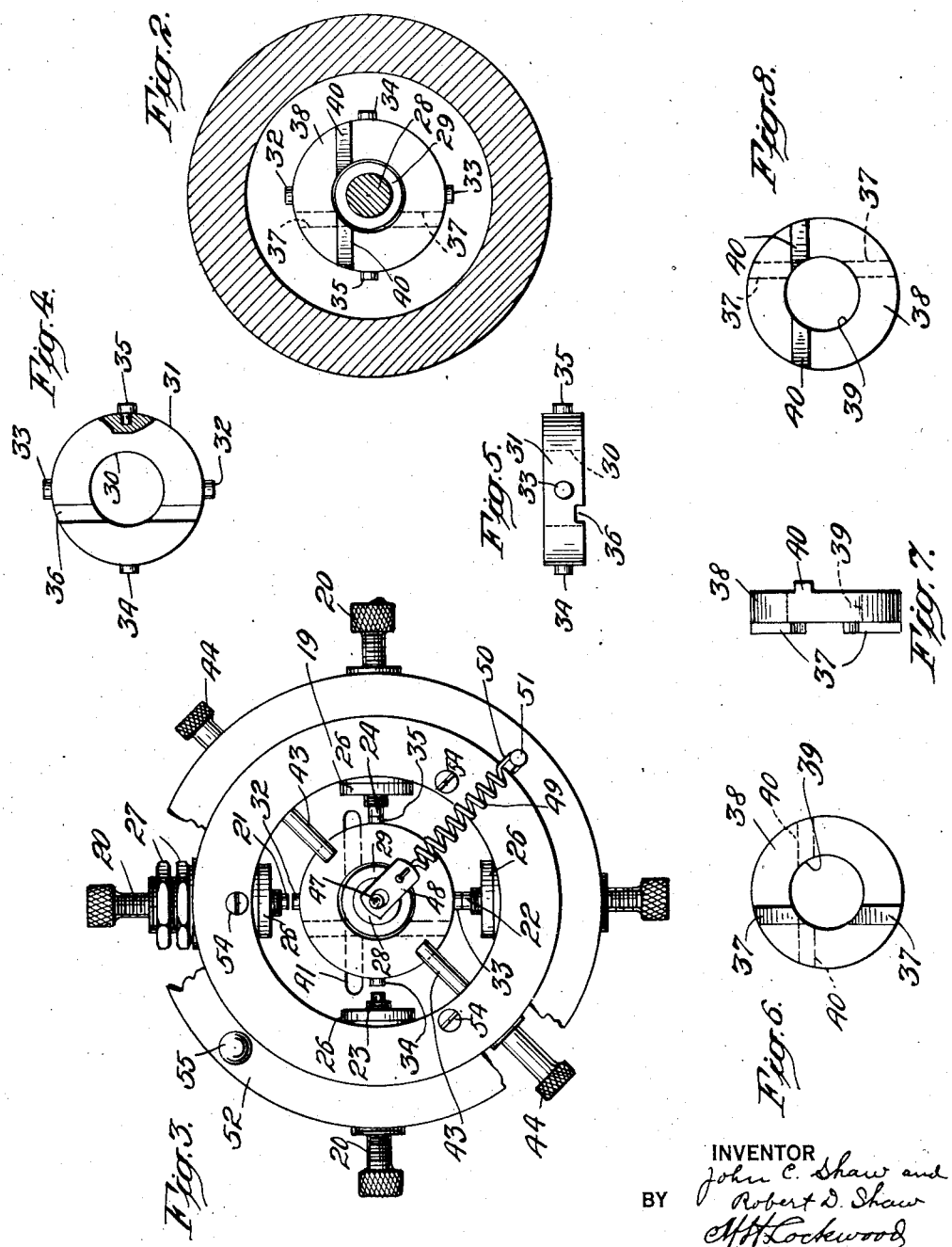

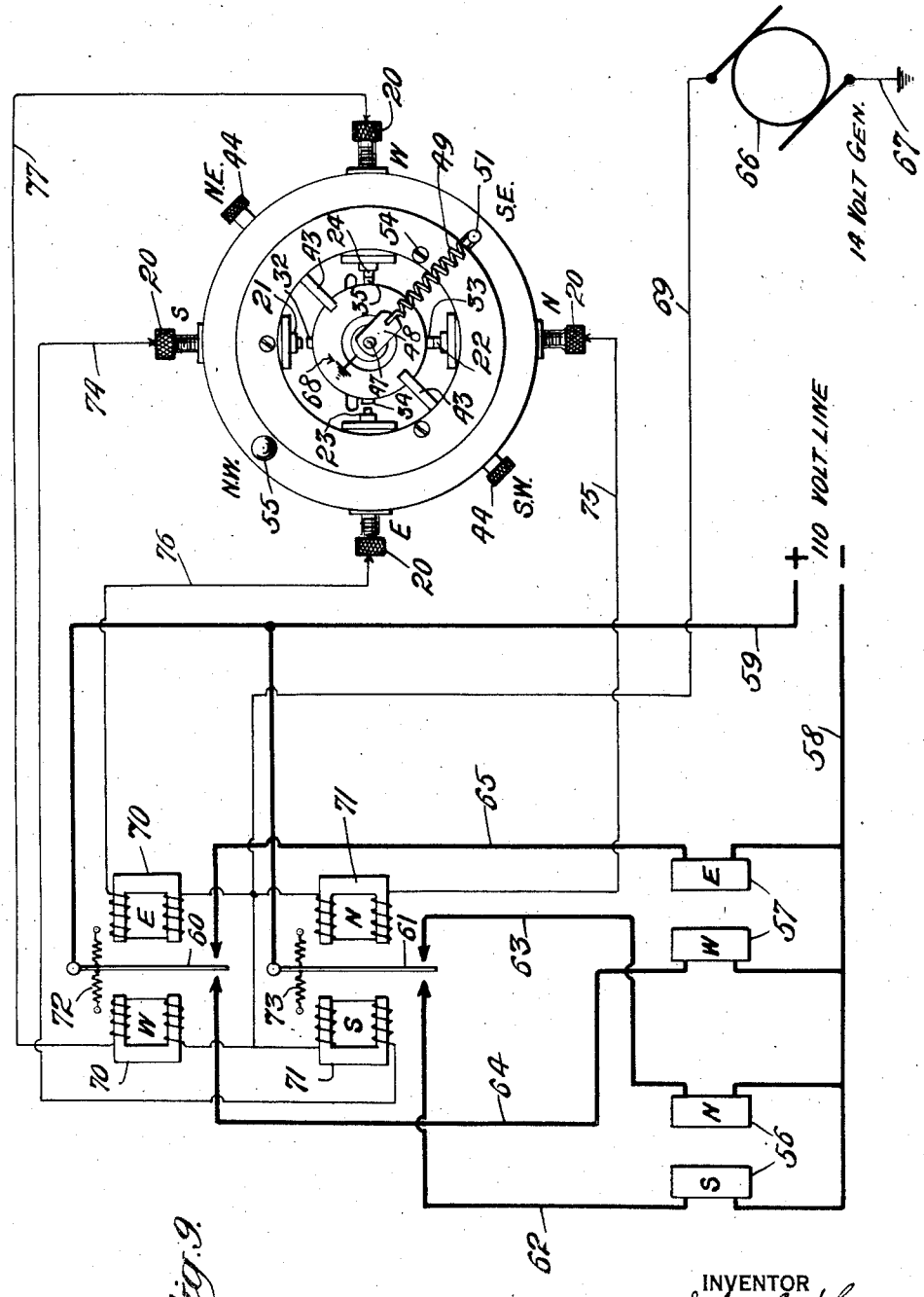

Jan. 12, 1932.                J. C. SHAW ET AL                1,840,853
                              CONTOURING TRACER
                            Filed Sept. 6, 1928            4 Sheets-Sheet 4

INVENTOR
John C. Shaw and
BY Robert D. Shaw
M. H. Lockwood
ATTORNEY

Patented Jan. 12, 1932

1,840,853

UNITED STATES PATENT OFFICE

JOHN C. SHAW AND ROBERT D. SHAW, OF BROOKLYN, NEW YORK, ASSIGNORS, BY MESNE ASSIGNMENTS, TO PRATT & WHITNEY COMPANY, OF HARTFORD, CONNECTICUT, A CORPORATION OF NEW JERSEY

CONTOURING TRACER

Application filed September 6, 1928. Serial No. 304,228.

This invention relates to an improved contouring or profile tracer for use in connection with machine tools, equipped with electro-magnetic clutch controlled feeds for moving the tracer and cutting tool in a single plane in four directions, that is, direct and reverse feed along lines at right angles to each other. In machines of this type, the tracer is preferably mounted on a carriage or support in parallel relation with a rotating cutter; and the tracer is adapted to follow the profile edge of a pattern or template, while the cutter operates on the work to reproduce the outline or contour of the pattern. A contouring tracer operating in conjunction with magnetic clutches for direct and reverse feed in two rectilinear directions at right angles, wherein direct and reverse feed contacts are mounted on a rotatable head, and wherein the feed control is adapted to be changed as the tracer is kept in contact with and follows the profile edge of the pattern by rotation of the contact carrying head, is shown and described in the patent of John C. Shaw, No. 1,683,581 of September 4, 1928, for electrical operation and control of machine tools. In previous forms of contouring tracers, however, electrical and/or mechanical interlocks have been employed in connection with a rotating head carrying contacts for direct and reverse feeds, angularly positioned by rotation of the heads, and while satisfactory operating results have been obtained with the rotating head type of contouring tracers, it has been found preferable to eliminate the interlock devices and simplify the construction. The object, therefore, of the present improvement is to provide a contouring tracer, wherein four oppositely disposed contacts are mounted in the same plane 90° apart, about a common center coinciding substantially with the axis of the tracer, and the tracer, preferably mounted for universal movement, is provided with corresponding contacts for completing circuits through the relatively fixed contacts for controlling direct and reverse feed in two rectilinear directions at right angles and in the same plane. In view of the fact that four magnetic clutches are provided for direct and reverse feed the feeds may be referred to as in four directions, that is, up and down and right and left, or they may be referred to by the cardinal points, north (N), south, (S), east (E) and west (W). In contouring tracer control of machine tools, it is obvious that feed in a single plane at any one time is limited to two directions, either up (N) or down (S) and toward the right (E) or to the left (W), and that when two of the feeds are in operation at the same time, the direction of motion will be 45° between them, if, as is preferable, the rate of feed is the same in the two rectangular directions. Since, in following a profile pattern, the direction of motion will swing around the circle, a further object of our improvement is to provide means for successively selecting the directions of feed motion by closing the corresponding tracer carried contacts on the desired relatively fixed contacts, which will represent the two directions of motion that, operating simultaneously or alternately will give the desired resultant and permit the tracer to follow the edge of the pattern or template while controlling and under the direction of the feeding means. In order to urge the closing of two contacts in adjacent quadrants NE, SE, SW, NW, a suitable spring or resilient member is preferably rotatably connected to the end of the tracer spindle, and in order to predetermine the direction of motion the opposite end of the spring is supported so that, by rotating the spring or resilient member, its direction of action may be changed so as to urge the contacts on the end of the tracer into closing relation with any two of the four fixed contacts. It will be understood that at no time can more than two contacts in adjacent quadrants of the four fixed contacts be closed by action of the resilient member on the corresponding tracer contacts, but by providing 360° of rotation for the resilient member, the line of action thereby may be changed so as to direct the tracer in following or making a complete circuit about the profile edge of the pattern or template. The preferred form of the present improvement is shown in the accompanying drawings, in which Fig.

1 is a vertical longitudinal section of the contouring tracer; Fig. 2 is a vertical transverse section on the line 2—2 of Fig. 1; Fig. 3 is a front elevation, looking toward the right in Fig. 1, with parts broken away to expose certain features; Figs. 4 and 5 are detail views of the tracer contact carrying block; Figs. 6, 7 and 8 are detail views of a slide block, cooperating with the tracer contact carrying block to provide rectilinear motions for the latter; Fig. 9 is a wiring diagram, showing a front view of the tracer and representing the relays and magnetic clutches diagrammatically, and Figs. 10 to 18 inclusive are diagrams for illustrating the operation of the contouring tracer.

Figure 16:
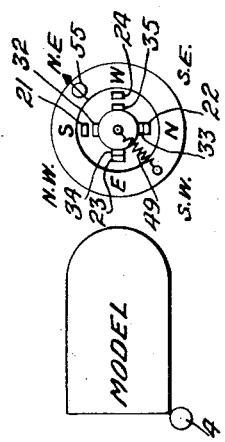
Figure 17:
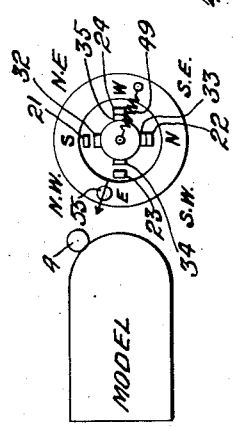
Figure 18:
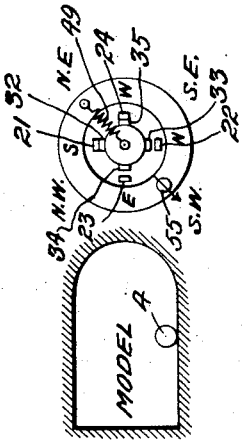
Figure 13:
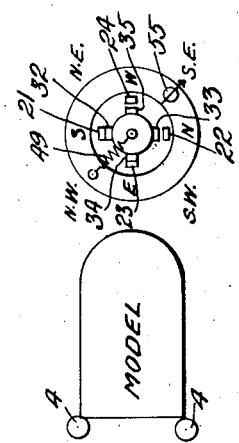
Figure 14:
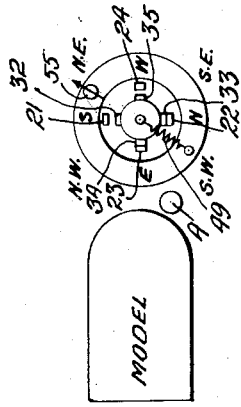
Figure 15:
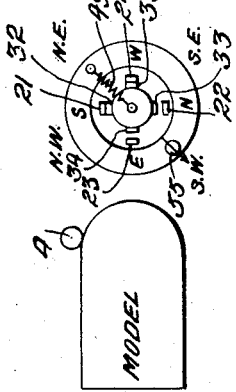
Figure 10:
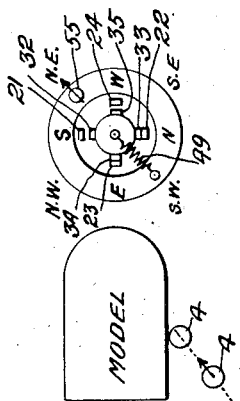
Figure 11:
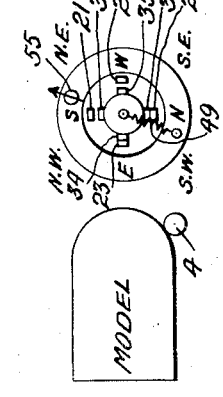
Figure 12:
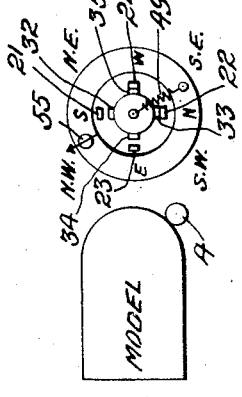

Referring to the drawings, it will be seen that the tracer comprises a body portion 1, which, in the present instance, is cylindrical and tubular and provided at 2 with a hemispherical socket bearing, held in place by a screw threaded thimble 3. The tracer point or head 4 is preferably mounted on the end of a spindle 5, carrying a hemispherical bearing 6 cooperating with the bearing socket 2, to provide universal wobbling movement for the tracer point 4. The tracer point 4 is preferably formed or mounted upon a conical member 7, which is clamped or secured to the end of the tracer by a screw threaded clamping nut 8, so that tracer points of different diameters or shapes may be readily attached to the spindle 5. The opposite or front end of the tracer body is provided with a head 9 screw-threaded to the cylindrical portion 1 at 10 and held in proper relation thereto by means of a set screw 11. The front end 12 of the tracer spindle 5, beyond the bearing 2—6, is of smaller diameter and extends forward into the head 9 and through an opening 13 therein, as will be seen in Fig. 1. In order to provide for properly balancing the tracer spindle 5—12, particularly when different tracer points are to be employed, a suitable counterweight or spring is adapted to cooperate therewith. In the present instance it is found preferable to provide a slidable upwardly thrusting plug 14, engaging the underside of the forward end 12 of the spindle, and resiliently supporting it, by means of a spring 15, the tension of which may be adjusted by means of a thumb screw 16, as will be seen in Fig. 1. This balancing arrangement is mounted in a tubular supporting member 17, screw-threaded into the underside of the tracer body portion 1; a lock nut 18 being provided for retaining any adjustment of the thumb screw 16. The front of the tracer head 9 is provided with a forwardly projecting annular extension 19, located concentrically of the axis of the cylindrical body portion 1 which, it will be understood, coincides with the axis of the tracer spindle 5—12. To provide fixed contacts in opposite quadrants about the end of the tracer spindle, as will be seen in Figs. 3 and 9, the annular tracer head extension 19 is preferably provided with four oppositely disposed thumb screws 20, carrying the contacts 21 (S), 22 (N), 23 (E) and 24 (W) respectively. The adjusting screws 20, carrying the contacts 21 to 24 inclusive, are preferably threaded through tubular nuts or thimbles 25 mounted in insulation bushings 26, the thimbles 25 being secured in place by nuts 27, which are utilized for connecting the respective contacts in the circuits of relays controlling magnetic clutches for direct and reverse feed, as shown in Fig. 9, and more particularly described hereinafter. As previously indicated, the fixed contacts 21 to 24 inclusive are preferably indicated with points of the compass letters N, S, E and W, representing motion up and down and to the right and left. In mounting the improved contouring tracer on the carriage with the rotatable cutter, it is preferable that the contacts 21 and 22, representing up (N) and down (S) motion should lie in a vertical plane passing through the axis of the tracer and the axis of the rotatable cutter. In this position, the other contacts 23 and 24 will lie in a horizontal plane and represent motion to the right (E) and to the left (W), this arrangement being shown in Fig. 9 of the drawings. At this point, attention is called to the fact that the position of the letters N, S, E and W on Fig. 9 of the drawings, and as indicated around the tracer head, are reversed from the ordinary compass positions and this is accounted for because motion of the carriage carrying the tracer and cutter will cause the tracer point 4 to be moved in the opposite direction when engaging the edge of the pattern or model, thereby moving the front end (12) of the tracer to break the contact and stop the feed motion. For closing the relay circuits controlling four magnetic clutches for operating the respective feeds, suitable contacts are mounted on the front end 12 of the tracer spindle, the latter, in the present instance, being provided with a further extension 28, projecting forward beyond the opening 13 in the tracer head 19, and provided with an annular bearing flange or bead 29, cooperating with and fitting closely within a central bore 30, in a tracer contact carrying block 31, preferably provided with four radially disposed equally spaced contacts 32, 33, 34 and 35 for cooperation respectively with the four relatively fixed cardinal point contacts 21 to 24 inclusive. The contact circuits are completed by grounding through the tracer spindle to the machine in the usual manner, this grounding connection being indicated (at 68) in Fig. 9. As just described, it has been found preferable to provide four tracer contacts, 32 to 35 inclusive, on the inner end of the tracer spindle and, furthermore, to provide for rectilinear movement thereof in the four directions required for cooperation respectively with the four contacts 21 to 24 inclusive. For movement of the tracer contacts, so that the engaging faces of contacts are always parallel, the block 31, carrying the contacts 32 to 35 inclusive, is, in the present instance. mounted for rectilinear sliding movement in the plane of the four fixed contacts 21 to 24 inclusive. For this purpose, as will be seen in Figs. 4 and 5, the rear face of the contact carrying block 31 is provided with a key slot or groove 36, slidably fitting on a key or tongue 37 projecting outward from an auxiliary slidable block 38, the key or tongue 37 preferably extending vertically, that is, parallel to a diametrical line between the N and S contacts, as will be seen in Figs. 1, 6 and 7. The auxiliary slidable block 38 is mounted back of the contact carrying block 31 and is provided with a central opening or hole 39, through which the reduced end 28 of the tracer spindle passes, the hole 39, however, being large enough to permit the bearing ring 29 to pass through and permit the slidable block 38 a sufficient amount of lateral movement without engaging the neck 28 of the spindle. The opposite or rear face of the auxiliary slide block 38 is provided with a tongue or key 40, located in a plane at right angles to the tongue or key 37 and adapted to slidably engage a horizontally disposed (parallel to a diametrical line between the E and W contacts) key slot or groove 41 in the face of the disc-like partition 42 of the head 9, as will be seen more particularly in Figs. 1 and 3. It will be seen that this tongue and groove mounting of the contact carrying block 31 provides for rectilinear reciprocating movement of the contacts 32, 33, 34 and 35 toward and from the corresponding fixed contacts 21, 22, 23 and 24. In order to hold the contact carrying block 31 in the plane of the fixed contacts 21 to 24 inclusive, any suitable means may be employed but preferably radially extending pins 43 project from opposite points across the front face of the contact block 31, as will be seen in Figs. 1 and 3. The pins 43, as here shown, are screw-threaded through the annular portion 19 of the tracer head and provided with knurled heads 44, enabling them to be withdrawn, when it is desired to remove the contact carrying block 31. Obviously, by having the fixed contacts 21, 22, 23 and 24 arranged in a plane at right angles to the axis of the tracer spindle and 90° apart, not more than two of the contacts and these in adjacent quadrants, can be closed, by engagement therewith of corresponding tracer contacts 32, 33, 34 and 35. Furthermore, in order to determine or preselect the two contacts (NE, NW, SE, SW) that are to be closed and thereby determine the resultant motion or directions of feed movement, the front end 28 of the tracer spindle, carrying the contact block 31 is adapted to be resiliently urged in a direction opposite the resultant direction it is desired that the carriage or slide carrying the tracer and cutter should be moved by the magnetic clutch feed devices, so that engagement of the tracer point 4 with the edge of the template or pattern will exert pressure in opposition to the resilient member to open or break the contacts. For this purpose, a pivotal screw 46 is preferably inserted in and extends in an axial direction outward from the end 28 of the tracer spindle, and is provided with an annular notch 47, in which the end of a link 48 may rotate, the link being connected to a spring 49, as will be seen in Fig. 1. As previously indicated, it is desirable to provide for changing the direction of pull or line of action of the spring 49, in order to preselect the two adjacent fixed contacts, 21 to 24 inclusive, that are to be closed, and thereby determine the directions of motion of the cutter and tracer. In order that this may be readily accomplished, the outer end 50 of the spring 49 is hooked over a stud 51, screw-threaded or otherwise mounted in the outer edge of an annular flat ring 52, which, as will be seen in Fig. 1, is mounted on the turned down outer end of the annular portion 19 of the tracer head, the ring 52 being rotatably held in position by an annular bearing plate 53, secured to the head by suitable screws 54. According to this arrangement, the ring 52 is concentric of the axis of the tracer and may be rotated by means of a knob or handle 55, preferably located diametrically opposite the stud 51, so that the angular position of the spring 49 may be changed. In this manner the direction of pull or line of action of the spring may be changed so that it will tend to close the corresponding tracer contacts on any two selected adjacent fixed contacts 21, 22, 23 and 24. The knob or handle 55, for rotating the spring 49, being located diametrically opposite the pin 51, is adapted, with the spring, to serve as a direction indicator, that is, showing the line of action of the spring, and approximately the direction of the resultant feed movement of the carriage, such as would occur normally when the two adjacent selected contacts are closed. The contouring tracer, as will be seen from the Shaw specification, hereinbefore referred to, is adapted to be mounted on a carriage, which also carries the rotating cutter, so that the tracer and cutter are movable in four rectangular directions in the same plane, that is up, down, right and left, the feed motions being controlled by two pairs of magnetic clutches 56 and 57; the latter being indicated diagrammatically in Fig. 9 of the drawings, which represents a diagram of the electrical connections. The magnetic clutches 56 and 57 are adapted to be energized by relatively high potential main line current, such as the 110 volt circuit 58 and 59, the lead 59 passing through relay armatures 60 and 61 and leads 62 and 63 to the respective magnetic clutches 56, (N and S) for up and down motion, and through leads 64 and 65 to magnetic clutches 57 (E and W) for right and left motion, and back through the main line lead 58. It is preferable to utilize lower potential current through the tracer operated contacts 21 to 24 inclusive, and this lower potential or 14 volt circuit may be taken from a generator 66, one side of which is grounded at 67, to complete the circuit through the frame of the machine and a ground connection of the tracer, as indicated at 68. The other side of the generator 66 is connected by lead 69 with relay magnets 70 and 71, marked E and W and N and S respectively; the relay magnets 71, N and S being adapted to operate on the armature 61 to close the higher potential circuit through one or the other of the leads 62, 63 to energize one of the magnetic clutches 56, (N or S); while the relay magnets 70, E and W, operate armature 60 to close high potential circuits through lead 64 or 65 to the magnetic clutches 57 (E or W). The relays 70 and 71 are double acting, that is, the respective armatures 60 and 61 normally stand midway between the relay magnets and are resiliently held in the central positions by suitable springs 72 and 73 so that normally, the magnetic clutch circuits are open, but by energizing one or the other of the relay magnets E, W, N, S, the corresponding magnetic clutch is energized for feed in the corresponding direction. The lower potential circuits from the relay magnets 70 and 71 are completed through lead 74 to contact S—21, through lead 75 to contact N—22; through lead 76 to contact E—23, and through lead 77 to contact W—24. As shown in Fig. 9, the contact closing spring 49 lies midway between contacts 22 and 24, N and W, which are the two closed contacts determining the directions of motion, but the handle 55 for rotating the spring, pointing to NW, lies midway between the contact screws E and S. The effect of the spring 49 in this position is to close contacts 35—24 and 33—22, so that the respective relays W and N will be energized to thereby move armature 60 to close the circuit 64 to the magnetic clutch 57, marked W, for feed to the left or west and to draw armature 61 over to close circuit 63 to the N magnetic clutch 56, for north or up feed. As previously indicated, if the rate of feed for all the magnetic clutches is the same, the resultant motion, in the position shown in Fig. 9, will be northwest, as indicated by the position of the handle 55 opposite the indicating letters NW. In order to illustrate the operation, attention is called to the diagrammatic views in Figs. 10 to 18 inclusive. In Figs. 10 to 17 inclusive, successive steps are represented as the tracer follows around the outer periphery or profile edge of a simple pattern or model, the tracer point being represented by the circle 4. A diagram of the tracer head is shown and the position of the handle 55 and of the corresponding contacts closed by the spring 49 represented diagrammatically in association with the model. In starting the operation, as will be seen by reference to Fig. 10, the direction of motion of the tracer (and also of the cutter, for both are on the same carriage) will be up and to the right or northeast, according to the position of the handle 55, that is, opposite position NE, and this motion will continue, as indicated by the arrow associated with the circle 4, until the point of the tracer (circle 4 without arrow) engages the edge of the model. When this occurs, the lower contact 22—33 (N) controlling up or north feed will be broken, and the contact 23—34 (E) will remain closed, so that motion will be to the right or east along the lower edge of the model. When the tracer point 4 (moving to the right) reaches the beginning of the curved end of the model, the pressure against the tracer holding open the north contact will be relieved and north or up motion will thereafter alternate with motion to the right, while following around the curved end of the model, as shown in Fig. 11. In order that the line of action of the spring 49 may be more effective in keeping the tracer 4 on the edge of the model, the knob 55 is preferably gradually moved counterclockwise to the position shown in Fig. 11. The resultant direction with the knob 55 anywhere in the northeast (NE) quadrant, as shown in Figs. 10 and 11, will be northeast, but when the tracer point reaches a position, in which the northeast direction is tangent to the curve of the model, (arrow circle 4 in Fig. 13,) the knob 55 should be turned into the northwest (NW) quadrant, as shown in Fig. 12, for otherwise the tracer will pass off at a tangent, as shown in Fig. 13. However, when the knob 55 is turned to the northwest (NW) quadrant, the N and W contacts will be alternately opened and closed as the tracer 4 works its way around the upper portion of the curved end of the model. During the latter operation, the knob 55 may be gradually turned over the quadrant NW, as indicated in Fig. 14. When the tracer 4 reaches the 45° position shown in Fig. 14, the northwest or resultant motion becomes tangent to the curve of the model, but then the knob 55 should be turned down nearly west so that the spring 49 will keep the tracer in contact with the model. As the tracer passes off the curve the handle 55 should be moved into the SW or southwest quadrant, as shown in Fig. 15. In the latter position, the south feed contacts will be completely broken and the west feed will continue until the end of the horizontal upper edge of the model is reached (Fig. 16). The knob or handle 55 should then be rotated further counterclockwise to the position shown in Fig. 16 and then the tracer 4 will move down or south along the left edge of the model, while the east contacts will be broken. Upon reaching the lower left corner, (lower circle 4 in Fig. 16), the knob 55 should be turned into the northeast quadrant NE, as shown in Fig. 17, after which the tracer 4 will follow along the lower edge of the model, moving to the right or east, while up or N feed contacts are held open, thus completing the circuit of the model and bringing the tracer back to the starting position shown in Fig. 10. It will be understood that the contouring tracer may be used for reproducing from either outside or inside profile edges, and in Fig. 18 there is illustrated an inner profile model, with the tracer 4, following along the lower inner edge and moving toward the left, as indicated by the arrow head. For obtaining motion toward the left, the knob 55 is turned to the SW position and remains in that position until the tracer reaches the left inner corner of the model. During this time the south feed will be broken, while the west of left feed will continue. It will be understood from the description for the outside contour operation, that by rotating the knob 55 counterclockwise the tracer 4 can be directed to follow around the inner profile edge of the model in Fig. 18; and the description need not be repeated. While the preferred form of the improved contouring tracer has been shown and described, it will be understood that it is not limited to the details of construction shown, for various modifications therein and in the connections and arrangements may be made without departing from the spirit and scope of the invention.

We claim:—

1. A contouring tracer comprising a body portion, a tracer supported thereby for universal lateral movement, four fixed contacts mounted on the body portion concentrically of the tracer and 90° apart, electrical circuits from the respective fixed contacts for controlling the motion of the tracer and tool in four rectangular directions in the same plane, four movable contacts mounted for movement with the tracer for cooperation with the respective fixed contacts for closing and opening said circuits, means for urging two adjacent movable contacts toward closing on the corresponding fixed contacts, and means for selecting the two movable contacts to be urged toward closing.

2. The contouring tracer as in claim 1, wherein a radially acting resilient member urges the adjacent movable contacts toward closing and means for rotating said resilient members permits selecting the movable contacts to be urged toward closing.

3. A contouring tracer comprising a body portion, a tracer on a spindle pivotally supported in said body portion for universal lateral movement, four fixed contacts mounted 90° apart on the body portion concentrically of said tracer spindle, electrical circuits from the respective fixed contacts for controlling the motion of the tracer and tool in four directions, a corresponding number of movable contacts mounted on said tracer spindle for cooperation with the respective fixed contacts for closing said circuits, means for urging two adjacent movable contacts toward closing and for resiliently holding them in engagement with the corresponding fixed contacts and means for directing the line of action of said resilient means to determine which of the movable contacts are to be urged toward closing on the corresponding fixed contacts.

4. The contouring tracer as in claim 3, wherein said resilient means for the movable contacts comprise a helical spring having one end rotatably supported on the end of the tracer spindle and its other end supported for rotation concentrically of the spindle to vary the radial line of action of the spring.

5. The contouring tracer as in claim 3, wherein the movable contacts are mounted on the tracer spindle for rectilinear movement in four directions at right angles to each other in the same plane, such as up, down, right and left.

6. A contouring tracer comprising a tracer, four fixed contacts mounted 90° apart circumferentially of the tracer and radially equidistant therefrom, electrical circuits from the respective fixed contacts for controlling the motion of the tracer and tool in four directions, four movable contacts supported on a member movable in the plane of the fixed contacts for closing said circuits, a tracer spindle adapted to move said movable contact member to open and close the respective circuits and a rotatable member for selectively urging toward closing two adjacent movable contacts with two corresponding fixed contacts.

7. A contouring tracer comprising a tracer on a universally movable tracer spindle, four circumferentially and radially fixed contacts, located in opposite quadrants and equally spaced angularly and radially of the tracer spindle, electrical circuits from the respective fixed contacts for controlling feed of the tracer and tool in four rectangular directions, four movable contacts, a universally movable member supporting said movable contacts for cooperation with the four fixed contacts, said universally movable member being adapted to be moved to make and break the respective circuits by lateral movement of said tracer, a resilient member for urging contacts on the universally movable member toward closing with the corresponding fixed contacts, the quadrant arrangement being adapted to permit only the closing of the contacts in two adjacent quadrants at a time, and means for rotating said resilient member to determine which of the contacts are to be urged toward closing.

8. The contouring tracer as in claim 7, wherein said universally movable contact carrying member is mounted for rectilinear movement toward and from the respective fixed contacts and is controlled in its movements by being mounted on the end of the universally movable tracer spindle.

9. The contouring tracer as in claim 7, wherein the four fixed contacts are mounted upon an annular support concentrically of the tracer spindle and means is provided for adjusting the respective fixed contacts radially of said support for regulating the gap between the fixed and movable contacts.

10. The contouring tracer as in claim 7, wherein said universally movable contact carrying member comprises a block carrying the four contacts mounted for movement toward and from the respective fixed contacts in the plane of the latter, the directions of movement of the movable contact carrying member for opening and closing the respective contacts being substantially rectilinear so as to parallel the directions of motion of the feeds controlled.

11. A contouring tracer comprising a body portion, a tracer mounted on a spindle supported in said body portion for universal lateral movement, four circumferentially fixed contacts mounted on the body portion in a plane at right angles to the axis of the tracer spindle, said contacts being located radially equidistant from and spaced 90° apart around one end of said spindle, means for adjusting said contacts radially for properly locating them relative to the axis of said spindle, four movable contacts mounted on the end of said spindle and movable therewith in the plane of the fixed contacts, electrical circuits connected with the fixed contacts and adapted to be closed when the latter are engaged by the respective movable contacts for controlling the feed of the tracer and tool in four directions, the 90° spacing of the contacts allowing but two of the movable contacts to be closed on the corresponding two fixed contacts at a time, a resilient member for urging said movable contacts toward closing on the corresponding fixed contacts and means for varying the direction of action of said resilient member to predetermine which two of the movable contacts will be urged toward closing with the fixed contacts.

12. The contouring tracer as in claim 11, wherein the four movable contacts carried on the end of the tracer spindle are mounted for rectilinear movement toward and from the respective fixed contacts, the tracer being supported so that said rectilinear movement of the movable contacts take place substantially parallel with the four directions of feed motion, and means for preventing relative rotation between the fixed and movable contacts.

13. The contouring tracer as in claim 11, wherein the movable contacts on the end of the tracer spindle comprise four contacts mounted 90° apart around a block slidably mounted for toward and from rectilinear movements relative to the fixed contacts in the plane thereof, the tracer spindle being adapted to effect the respective toward and from movements by sliding the block.

14. The contouring tracer as in claim 11, wherein the movable contacts comprise four contacts mounted 90° apart around a block at the end of said spindle and having tongue and groove sliding connection with a second block, the second block having tongue and groove sliding connection with said body portion, the tongue and groove sliding connections being at right angles to each other and parallel to the lines of radial adjustment of the respective fixed contacts.

JOHN C. SHAW.
ROBERT D. SHAW